Figure 1:
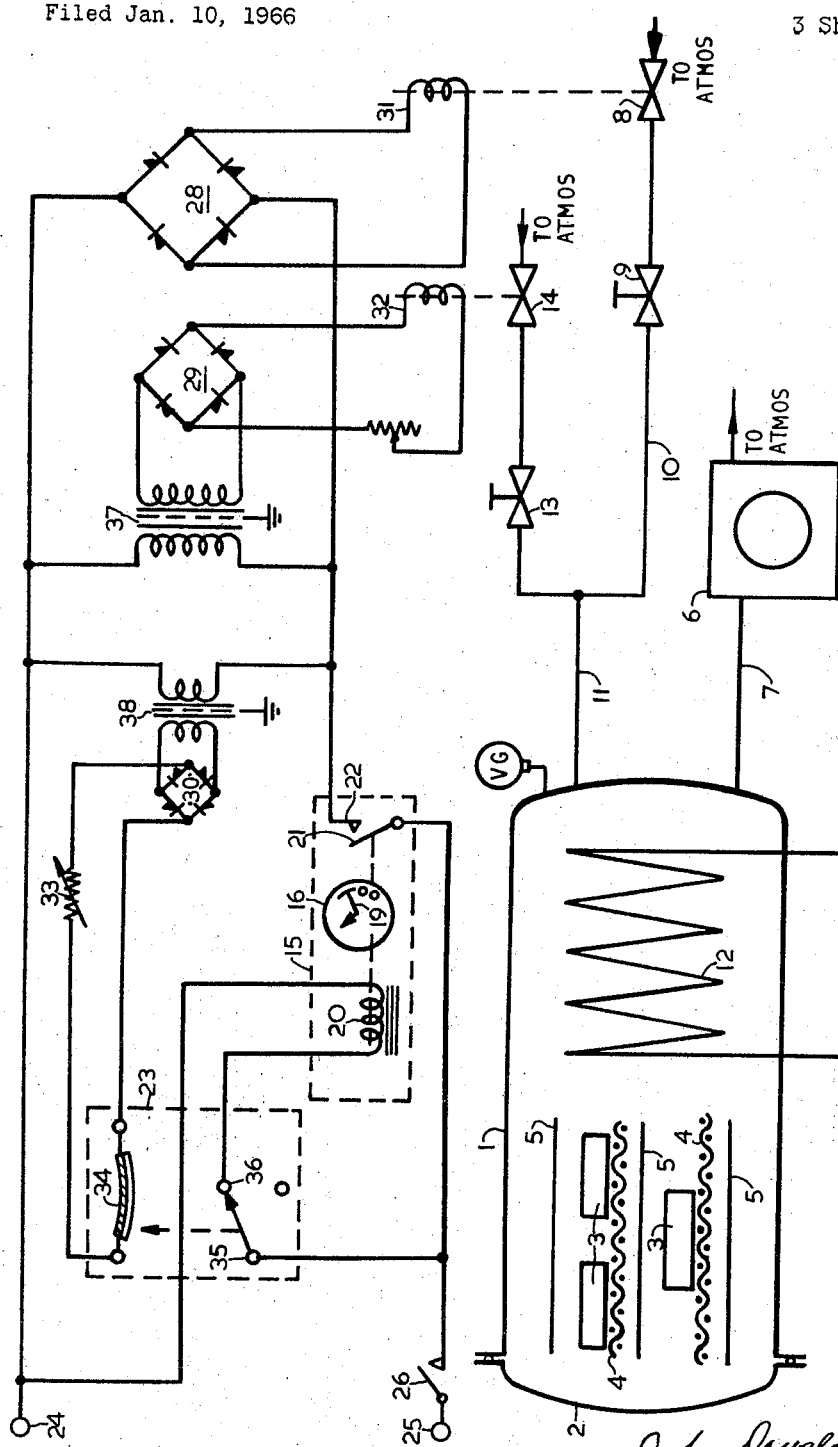

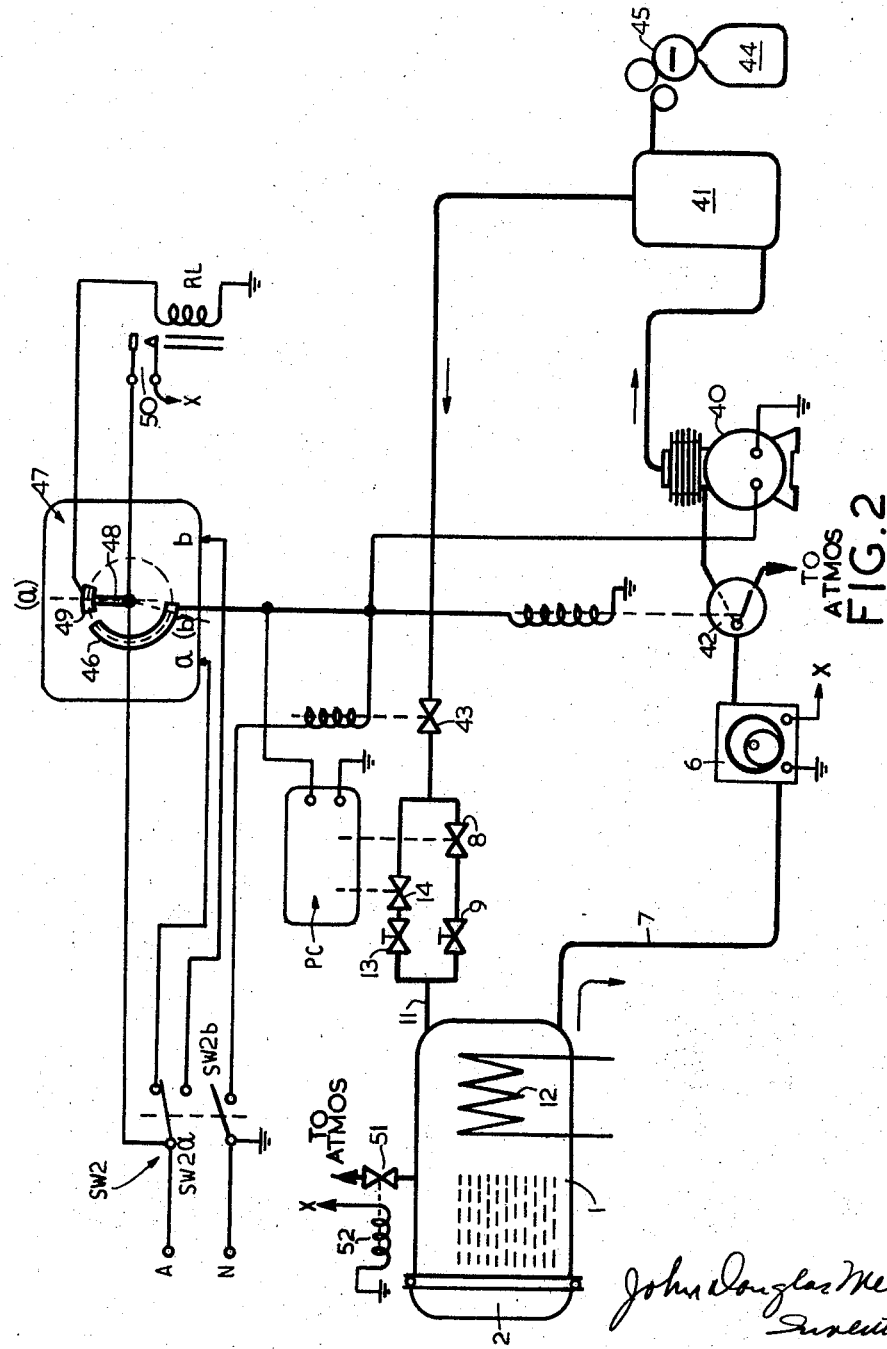

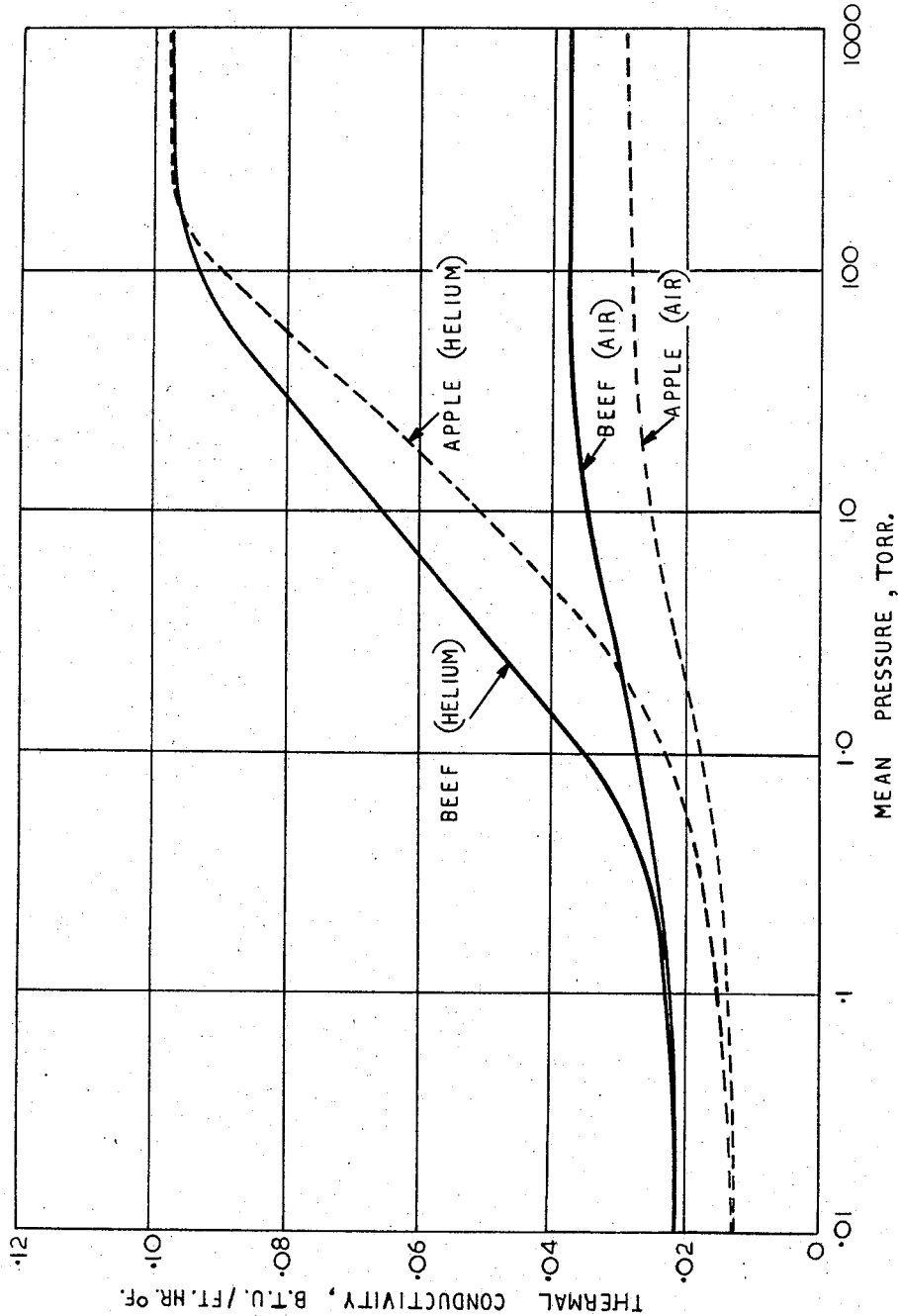

United States Patent Office 3,352,024
Patented Nov. 14, 1967

3,352,024
FREEZE-DRYING PROCESS
John Douglas Mellor, Greenwich, New South Wales, Australia, assignor to Commonwealth Scientific and Industrial Research Organization, East Melbourne, Victoria, Australia, a body corporate of Australia
Filed Jan. 10, 1966, Ser. No. 519,801
Claims priority, application Australia, Jan. 21, 1965, 54,196/65
10 Claims. (Cl. 34—5)

The invention relates to the freeze drying of food and similar heat labile substances.

Freeze drying is a known process whereby without destroying their inherent physical and chemical characteristics substances may be dried by freezing the water in them and subliming the ice so formed by applying heat to the frozen product usually while the whole is maintained in a vacuum. The heat may be applied either by radiation or by direct contact; it travels by conduction through the dry outer layer to the inner frozen core where it converts the ice directly to water vapour. This dry outer layer is formed spontaneously around, for example, a slab of frozen food when the frozen food is placed in a vacuum; because the layer is porous outward, diffusion of water vapour can take place through it.

The vapour generated by the ice is usually removed from the system either by condensation on a refrigerated coil, or by pumping directly to the outer atmosphere. In known methods of freeze drying a vacuum pressure is maintained constant and is usually about 0.5 torr, at which pressure the ice sublimes at about —4° F. on heating by radiation. The vapour is usually condensed on a refrigerated coil held at a temperature of about —40° F.

A disadvantage of freeze drying by conventional methods such as have been described above is that shortly after the commencement of freeze drying the drying rate falls appreciably and remains at a relatively low level as compared with the initial rate of drying.

It is possible to increase the rate of drying of the frozen core by increasing the heat input at the stage where the drying rate has fallen to a relatively low level. However, the danger of overheating the surface and thus spoiling the product sets a limit to any such method of enhancing the heat input. It has also been found that when the vacuum pressure is reduced to a very low level in order that the flow of vapour from the product to the vacuum space around it might be facilitated the heat transfer coefficients of many foods are then too low (e.g. about 0.025 B.t.u./ft. hr. deg. F. for dry beef at 0.5 torr) for heat transfer to take place effectively, and accordingly this procedure also is conducive to overheating of the product. Because of the fall in thermal conductivity of the material as drying proceeds it is usually necessary in known methods of freeze drying for the heat input to be reduced towards the later stages, and in at least one known system the heat input is regulated by a device responsive to vapour pressure changes occurring in the vicinity of the product during freeze drying.

The present invention provides a method of freeze drying in which a substantial improvement in over-all efficiency and speed of drying may be obtained.

According to this invention a method of vacuum drying frozen food and similar heat labile products includes the steps of repeatedly reducing the vacuum pressure to a first predetermined level for a first period of time and raising the vacuum pressure to a second predetermined level for a second period of time while drawing off water vapour from said food or product.

Also according to this invention a method of freeze drying frozen food and similar heat-labile substances comprises the steps of subliming the ice by applying heat to the frozen food or substance while at the same time maintaining said food or substance in a partial vacuum, and removing the water vapour formed by the sublimation, said method being characterized in that the vacuum pressure is cyclically varied between predetermined higher and lower levels during drying. The optimum pressure and duration of the periods of low and high pressure, will depend upon the nature of the product, the gas composition, the dimensions of the chambers, and the efficiency of the vacuum and refrigerating systems and can be determined by experiment, or, assuming the nature of the gas and characteristics of the machinery are known, by calculation.

This invention also includes apparatus for carrying out the process.

In order that this invention may be better understood a theoretical explanation of the principles underlying the invention will now be given.

It has been established by experiments that the resistance to flow of vapour through the porous dry layer of material being dried by freeze drying can be as much as six to ten times greater than that of the vacuum space around it. Consequently water removal from the material (and hence the drying rate) is determined principally by the rate of passage of water vapour through the material. Now at the commencement of freeze-drying operations the total gaseous pressure in the system falls rapidly while the system is being evacuated, and only later does it become more or less constant. Measurements have shown that in this initial stage the partial water vapour pressure in the vicinity of the dry surface rapidly approaches the absolute vacuum pressure. Also, at the temperature prevailing, the vapour pressure near the ice interface is at this time close to its saturation value. There is thus a distinct difference in vapour pressure as between the ice interface and the outer surface. Under these conditions flow of vapour from within the product is relatively fast, since it corresponds to hydrodynamic flow rather than simple diffusion. For a given heat input there is at about the same time a flow of heat inwards, since the thermal conductivity of the dry porous layer is largely determined by the presence of vapour and air (or whatever gas may be present) in the interstices within this layer.

Other measurements that have been made have shown that in a reasonably short time after the commencement of freeze drying a steady state or equilibrium condition is attained within the dry porous layer such that the vapour pressures at the outer surface and at the interface are close together and equal to the saturation value for ice at the temperature of the interface. When this state is attained vapour passing outwards from the interface towards the outer surface through the dry layer (which itself increases in relative thickness as drying proceeds) is driven against a temperature gradient by a relatively small vapour pressure difference. Accordingly vapour removal from the product is now controlled by relatively slow diffusion processes instead of by the faster hydrodynamic flow that previously prevailed. There is thus an appreciable fall in the rate of freeze drying.

This invention is based upon the realisation that variation of the vacuum pressure according to the method of this invention has the effect of reproducing conditions obtaining at the commencement of freeze drying in that as soon as the steady-state condition is attained the pressure is caused to increase whereby the thermal conductivity and the temperature of the interface are raised, so that when the pressure is again reduced conditions are again conducive to hydrodynamic flow of water vapour.

The exact means used to bring about the required variation in pressure during the pressure cycling operation which is the essential feature of the invention is not of paramount importance, but two systems will now be described with reference to the accompanying drawings to enable the invention to be more fully understood.

In the accompanying drawings:

FIGURE 1 is a diagrammatic drawing of an open system for carrying out the method of the invention, FIGURE 2 is a diagrammatic drawing of a closed system for carrying out the method of the invention, and FIGURE 3 is a graph used in explaining the invention.

Referring now to FIGURE 1, a known type of vacuum chamber 1 has a door 2 by which the frozen product 3 can be introduced into the chamber. The product rests on a supporting grid 4 between top and bottom heater plates 5. A vacuum gauge VG is provided to assist in setting air pressure to preselected values.

A vacuum pump 6 is connected to the chamber by a vacuum line 7 and the pump runs continuously during the freeze drying. Air (or other chosen gas with a suitable high thermal conductivity) is admitted to the vacuum chamber through two admittance valves 8 and 9 placed in series by way of the air or gas lines 10, 11. Preferably the line 11 is connected to the vacuum chamber at a point adjacent the refrigerator coils 12. The valve 9 is an adjustable admittance valve preset to a suitable high pressure (for example, 20 torr) and the valve 8 is a normally open solenoid shut-off valve operated electrically. The air line 11 is also connected to a second pair of valves 13, 14 in series, the valve 13 being also an adjustable needle valve preset to a suitable low pressure (for example, 0.2 torr), and the valve 14 being a normally closed solenoid operated valve. When the valve 8 is closed and the valve 14 is open the vacuum pressure in the chamber is reduced to a low pressure limit of for example 0.2 torr in little more than a minute through the action of the vacuum pump which is kept continuously running. During the fall in pressure in the chamber the temperature of the product falls but the temperature of the refrigerated coil rises. Following the rise in pressure when the valve 8 is again opened and the valve 14 is closed these changes in temperatures are reversed. The cycle is then repeated.

One particular arrangement by which the cyclic control of the valves 8 and 14 can be effected will now be described. It is not the only arrangement by which the cyclic pressure variations can be obtained and in fact, since the essential feature of the invention is cyclic operation of the vacuum pressure in a desired manner, any suitable equipment which combines vacuum valves and a timer, and which has variable controls and gauges for setting vacuum pressure levels and time intervals, may be used.

In the arrangement shown in the drawings, the period which the valve 8 is held closed and the valve 14 held opened and vice versa is determined by a mechanical relay clock 15 which includes a clock movement 16 having a moving arm 19, which, after a preselected time, causes normally open contacts 21, 22 to close. 20 is the clock start coil. The remaining part of the cycle is determined by the thermal delay switch 23.

Assume that an A.C. mains supply source is connected to terminals 24, 25 and that switch 26 is closed after the pump 6 has been running continuously. The thermal delay switch 23 may, for example, be set for 74 seconds and the mechanical relay clock be set for 222 seconds. At the start of the cycle valve 14 is closed and valve 8 is open and air is bled into the chamber 1 through valves 8 and 9 to maintain a pressure inside the chamber of 20 torr. The A.C. mains is applied to the clock start coil 20 by way of the normally closed contact 35, 36 of the thermal delay switch. After 222 seconds the arm 19 closes contacts 21, 22 thereby applying A.C. mains through transformers 37, 38 to the bridge rectifiers 29, 30, and directly to bridge rectifier 28. The D.C. output from rectifier 28 is applied to solenoid 31 to close the valve 8. The D.C. output from rectifier 29 is applied to solenoid 32 to open valve 14. Accordingly, air is bled into the chamber through needle valve 13 when the pressure in the chamber falls to 0.2 torr. The D.C. output from rectifier 30 is applied, by way of a control resister 33, to a bimetal strip 34 in the thermal delay switch 23. After say 74 seconds the switch 23 operates and opens the contacts 35, 36, thus cutting off current to clock start coil 20 so that the clock contacts return to the open position causing valve 8 to open and valve 14 to close. The thermal switch cools quickly, causing contacts 35, 36 to re-engage and the cycle repeats.

The system just described uses air drawn from the atmosphere. However, if a high conductivity and/or preheated gas is used to assist in the heating of the frozen product, the design of the freeze dryer should be changed from one open to the atmosphere in the high pressure stage of operation to a closed system so that the gas can be conserved and recirculated. One such closed system is illustrated by way of example only in FIGURE 2 of the accompanying drawings.

Referring particularly to FIGURE 2 the illustrated closed cycle system is simply formed by connecting the exhaust of vacuum pump 6 to the inlet ports of the solenoid valves 8 and 14 via an optional booster pump 40 and a gas reservoir vessel 41 by means of two electrically operated valves 42 and 43. Valve 42 is a two-way valve that normally connects the exhaust of vacuum pump 6 to atmosphere but which, when energized, connects it to the inlet of booster pump 40. On the otherhand, valve 43 is a stop valve which normally closes the inlet to the solenod valves 8 and 14 but which, when energized, permits gas to flow from the vessel 41 to the latter valves. A high conductivity gas is used for this example and is supplied from a high pressure bottle 44 provided with a pressure regulating device 45 via which the gas from the bottle can be fed to the vessel 41.

The operation of the solenoid valves 8 and 14 is controlled by the pressure cycling controller PC as described with reference to FIGURE 1. The controller PC receives its electrical power from the fixed contact 46 of a time delay switch 47 having a moving contact 48 connected directly to the active line A of the supply. Finally, the coil of a relay RL is connected from a second fixed contact 49 in the time switch 47 and is provided with normally closed contacts 50 which, when open, de-energize the vacuum pump 6 and open a solenoid valve 51 on the vacuum chamber 1 to admit air into the chamber. The leads marked X on solenoid 52 of valve 51 and on the vacuum pump 6 are connected to lead X on contacts 50.

Assuming the moving contact 48 of the time switch 47 to be in position (a) shown in the drawings, the active line is connected via fixed contact 49 to relay RL so that its contacts are held open, the vacuum pump 6 is de-energized and air is admitted via valve 51 into the vacuum chamber 1. The cover 2 of the vacuum chamber 1 may therefore be opened and the chamber loaded with the frozen product to be dried. At this stage, controller PC is not supplied with electric power, stop valve 43 is held closed and the two way valve 42 connects the exhaust of the vacuum pump 6 to atmosphere.

As soon as the vacuum chamber has been loaded and reclosed the two-pole two-position switch Sw2 is manually operated to commence the drying cycle. As a result, the drive motor of the time switch 47 slowly rotates the moving contact 48 to position (b) at the start of the fixed contact strip 46 and, in so doing, rotates the moving contact 48 from the fixed contact 49 so that the relay RL is de-energized with the result that the vacuum pump 6 is switched on and valve 51 is closed. While the moving contact 48 travels from position (a) to position (b) the vacuum pump 6 has sufficient time to pump out the vacuum chamber 1 and inlet piping back to stop valve 43, the air from the chamber being exhausted to atmosphere through the two-way valve 42. When the moving contact 48 stops at position (b) it contacts strip 46 and energizes the valves 42 and 43, the booster pump 40 and the pressure cycling controller PC. (It will be noted that the stop valve 43 is energized because the switch Sw2b is closed). Gas from the vessel 41 therefore flows through the stop valve 43 and the pressure cycling valves 8 and 14 to the chamber 1 and is exhausted from the chamber 1 and fed back to the vessel 41 via the two-way valve 42 and the booster pump 40. For the remainder of the freeze-drying run the pressure cycling controller PC operates continuously.

When the drying of the product is completed, the switch Sw2 is manually returned to its original position so that the valve 43 is de-energized (by Sw2b) and so that the moving contact 48 rotates along the contact strip 46 and is returned to position (a) and contact 49. Until contact 48 leaves the strip 46, gas remaining in the chamber 1 is pumped into the vessel 41 but is not returned from the vessel to the chamber but when contact 48 leaves strip 46 the pressure cycling controller PC, booster pump 40 and the two-way valve 42 are de-energized and, once position (a) is again reached, the consequent energization of relay RL stops the vacuum pump 6 and allows air into the chamber 1 so that it can be opened and the freeze-dried product removed.

The effect of carrying out freeze drying in accordance with the method of this invention—whether with an open or a closed gas cycle—is that during that part of each cycle wherein the vacuum pressure is permitted to increase there is a rise in the thermal conductivity of the dry porous layer of each food particle and, consequently, there is greater heat transfer within the product by conduction. During this stage of each cycle the outward rate of vapour flow may actually decrease though this is not always the case.

During that part of each cycle wherein the vacuum pressure is reduced there occurs a relatively high pressure gradient between vapour at the ice interface within the frozen product and the exterior surface of the product. As a consequence the outward hydrodynamic flow of vapour increases even though at this stage the thermal conductivity may decrease. The heat transfer and vapour flow effects thus operate more or less independently and alternately when the vacuum pressure is caused to rise and fall in the manner described. As has been confirmed by experiments there is a consequent increase in over-all efficiency of freeze drying owing to the fact that these two factors no longer operate in opposition as they do during the steady state in known methods of freeze drying. The examples illustrate the increase in efficiency obtained.

In carrying out the method of this invention it is desirable that the duration of each low pressure period should be so related to the duration of each high pressure period that maximum efficiency is obtained. If the time spent at the low pressure is made just short enough to substantially complete the rapid vapour transfer from the product and the time spent at the high pressure is made just long enough to raise the temperature of the product to its maximum safe level this object will be attained and significantly faster freeze-drying rates will result.

The optimum ratio of these two periods will in fact differ from case to case according to the composition of the gas within the chamber and according to the structure, chemical composition, and physical dimensions of the product being dried; it will also depend upon the range of operating pressures chosen which in part at least will be determined by the dimensions of the chamber, its charge, and on the efficiency of the pumping and refrigerating systems. However, experiments and calculations have shown that for each class of product to be freeze dried a pressure cycle can be found that results in near optimum performance of any given freeze-drying equipment of conventional design.

EXAMPLE CALCULATION OF OPTIMUM CYCLE CONDITIONS

*Pressures.*—An obvious requirement for efficient cyclic freeze-drying is that the transition between the pressure levels should be effected as rapidly as practicable. The change from low to high pressure can be made quickly by simply admitting gas to the evacuated chamber, but the change from high to low pressure depends upon pump-down rate and the difference between the high and low pressures. The difference between the high and low pressures for a given vacuum pump should thus be the minimum consistent with obtaining the increased drying rates. The important consideration, therefore, is to select the maximum difference in product thermal conductivity for the minimum pressure difference. FIGURE 3, which is a graph of the thermal conductivity of freeze-dried apple and beef against gas pressure, shows that the best pressure difference is between 0.2 and 20 torr using air. For a high thermal conductivity gas such as helium the pressure difference should be between 0.2 and 100 torr for beef and 0.2 and 150 torr for apple.

A low pressure of 0.2 torr is necessary to ensure complete transfer of vapour during the low pressure part of the cycle. It will be seen from the curves that little will be gained in thermal conductivity by increasing the pressure range, nevertheless, some products could be satisfactorily freeze-dried if the low pressure lies between 0.1 and 1 torr. The high pressure could lie between 10 and 50 torr for air, and between 100 and 200 torr for high conductivity gases.

*Times.*—For vapour flowing out of the product during the low pressure part of the cycle, theory and experiment predict that the velocity (V) of the vapour varies with time according to the equation of an hydrodynamic relaxation oscillator; viz., $$V = Vd(1 - e^{-Bt}) \qquad (1)$$

Where $Vd$=steady state velocity, $e$=2.718, the base of the natural logarithm, and $B$=relaxation time constant which is a function of the physical properties of the product, including its thickness, the properties of the water vapour, and the pumping speed (for example, B is found to be 0.03 sec.$^{-1}$ for beef about ½" thick). Since the vapour flow rate is an exponential function of time, some limit must be set to the flow rate if the low pressure period is not to continue indefinitely. A reasonable time $t1$ for the low pressure part of the cycle can therefore be obtained by allowing the flow rate to reach between 85 and 93% of its steady state velocity—that is, by assigning a value to the fraction $f$ or $V/Vd$ of between 0.85 and 0.93. However, optimum results will only be obtained for a particular optimum value of $f$, and this is best calculated although it can, of course, be found by experimentation.

By comparing the heat transfer conditions for constant pressure and cyclic pressure freeze-drying processes, it can be shown that:

$$1 - f = e^{r-f/1-f} \qquad (2)$$

Where $f$ is the abovementioned fractional heat or vapour flow that provides an optimal process and where $r$ is the experimental drying time ratio—that is, the ratio of cyclic to constant pressure drying times for a given heat transfer—which was found to average 0.65 for all drying runs. Solving Equation 2 for $f$, the optimal fraction of 0.89 is obtained and substituting this fraction for the ratio $V/Vd$ in Equation 1, the optimum duration of the low pressure period is found; viz., $$\frac{V}{Vd} = 0.89 = 1 - e^{-0.03 t_1}$$

$$\therefore t_1 = \frac{2.303 \times 0.959}{0.03} \simeq 74 \text{ sec.}$$

For heat flowing into the product during the high pressure part of the cycle, theory and experiment predict that the amount of heat so flowing varies continuously with the vacuum pressure, but depends on the effective thermal conductivity of the gas-filled porous product. Data for freeze-dried beef show the thermal conductivity rises from 0.024 to 0.037 B.t.u./ft. hr. deg. F. over the pressure range 0.2 to 20 torr. After the time of the low pressure part of the cycle has been determined as described the time interval of the high pressure part of the cycle is given by taking 0.89 times the constant pressure thermal conductivity ($\simeq 0.025$ at 0.5 torr) divided by the driving time ratio (=0.65 av. for all drying runs), and equating it to the weighted mean of the thermal conductivities 0.024 and 0.037 with respect to low and high pressure time intervals ($t_1, t_2$) respectively, i.e.

$$\frac{0.89 \times 0.025}{0.65} = \frac{0.024 t_1 + 0.037 t_2}{t_1 + t_2}$$

$$\therefore \text{interval ratio } \frac{t_2}{t_1} \simeq 3$$

Thus $t_2 = 3t_1 = 3 \times \simeq 222$ sec.

The near optimum pressure cycle for cyclic freeze drying of beef using air is therefore a low pressure of 0.2 torr for 74 sec., followed by a high pressure of 20 torr for 222 sec., the total period $t_1 + t_2$ of the cycle being 296 sec.

In general the duration of the near optimum pressure cycle can be determined by taking particular fractional values for (i) the transition from zero to steady-state velocity of the water vapour to obtain the low pressure time interval, and of (ii) the constant pressure thermal conductivity of the dry product to obtain the high pressure time interval. For air as the gas the fractional values lie in the range of 0.85 to 0.93 (and usually will be 0.89) for both low and high pressure parts of the cycle. For gases having a higher thermal conductivity than air, such as helium, the duration of the near optimum pressure cycle for the same product will be shorter. The low pressure time interval will be determined by a fractional value of 0.85 to 0.93 as before since it depends very largely on the pumping speed. However, the high pressure time interval will be determined by values lower than the above range for air since this time interval depends upon the thermal conductivity of the gas.

The corresponding range of time intervals for the forementioned fractional values is generally a low pressure time interval of the cycle between 1 and 2½ minutes, and a high pressure time interval from 1 to 9 times as long as the low pressure interval.

In the "cyclic" process of this invention it has been found necessary to reduce the heat input to the product in the final stages of drying to prevent overheating it, but early reduction in heat input is not so important as in the existing freeze-drying process as constant pressure.

Some examples are now given to illustrate the extent to which the freeze-drying time of widely different food products can be shortened by using the method comprising the invention.

*Example 1.—(Cooked meat product)*

A pilot freeze-drying run was carried out under "cyclic" vacuum pressures in trays loaded with 3.3 lbs. frozen cooked meat product per sq. ft. of tray area. When the "cyclic" pressure was caused to vary from 0.4 to 20 torr with the heaters at 252° F., the temperature of the refrigerated coil varied from —26 to —31° F., and that of the product from —4 to —11° F. The temperature of the heaters was caused to fall gradually to 60° F. two hours before the end of the "cyclic" presesure run. The high pressure interval of the cycle was set at about three times the low pressure interval which was longer than a minute. Another "cyclic" pressure run was also carried out under similar conditions but with the heater temperature at 280° F., this being the highest temperature that was possible without scorching the surface of the product.

For comparison, a further freeze-drying run was carried out in trays loaded with 3.3 lbs. frozen cooked meat product per sq. ft. of tray area under a constant vacuum pressure of 0.4 torr. The temperature of the heaters was 255° F., the refrigerated coil —31° F. and the product —4° F. All the temperatures were maintained fairly constant during the run. The temperature of the heaters was caused to fall gradually to 60° F. three hours before the end of the constant pressure run.

Drying times of 3½ to 5 hours for the two heater temperatures of 252 and 282° F. were obtained with "cyclic" pressures, as compared with 8 hours under constant pressure conditions. The "cyclic" freeze-drying time represents a decrease of 37.5% against the comparative freeze-drying time under constant pressure, and a decrease of 50% over some existing freeze-drying times, using similar type heaters, and the same product.

*Example 2.—(Whole egg pulp)*

Pilot freeze-drying runs were carried out as in Example 1 with 2.9 lbs. frozen whole egg pulp per sq. ft. of tray area. At a constant pressure of 0.5 torr and a temperature of 201° F. at the heaters, the refrigerated coil and product temperatures were —47 and —2° F. respectively. When the "cyclic" pressure was varied from 0.35 to 20 torr with the heaters at 208° F., temperature variations in the coil and product were —44 to —54° F., and +1 to —6° F. respectively. The heater temperatures were gradually raduced as before. The ratio of high to low pressure intervals in the cycle was about 2:1 with the low pressure interval slightly longer than before.

Drying times of 7¾ and 10 hours for "cyclic" and constant pressures respectively were obtained which represent a decrease of 25% in drying time of the "cyclic" process over the constant pressure process.

*Example 3.—(Apple rings)*

Pilot freeze-drying runs were carried out as in Example 2 with 2 lbs. frozen apple rings per sq. ft. of tray area. At a constant pressure of 0.5 torr an da temperature of 201° F. at the heaters, the refrigerated coil and product temperature were —47° F. and 7° F. respectively. When the pressure was varied cyclically from 0.35 to 20 torr with the heaters at 214° F., temperature variations in the coil and product were from —36 to —54° F and from 19 to 12° F. respectively. The heater temperatures were gradually reduced to 60° F. as before. The high and low pressure intervals in the cycle were each over 2 minutes, and were below the optimum.

Drying times of 7¼ and 12½ hours for "cyclic" and constant pressuers respectively were obtained. These represent a decrease of 42% in drying time by the "cyclic" process over the constant pressure process. This is a 15% decrease in drying time over an existing contact heating process at constant pressure for diced apple.

What I claim is:

1. An improved method of freeze-drying frozen food or other heat labile products wherein ice formed within the product is sublimed while the product is maintained under a low gas pressure within a vacuum chamber, the product being heated and the water vapour emitted therefrom being removed during drying; said method being characterised in that, during drying, the product is subjected to repeated cycles of gas pressure variation, each cycle of pressure variation comprising the following steps:
    (a) rapidly reducing the pressure to a lower predetermined level,
    (b) maintaining the pressure substantially at said lower level for sufficient time to allow the resultant initial rapid sublimation and vapour flow from the product to be substantially completed,
    (c) rapidly raising the pressure to a predetermined higher level, and
    (d) maintaining the pressure substantially at said higher level for sufficient time so as to allow the product temperature to rise to a given maximum safe level while at the same time inhibiting the diffusion of water vapour therefrom;

and said method being characterised in that the higher and lower pressure levels are such that the difference between the thermal conductivities of the product at the two pressures and in the gas concerned is not substantially less than the difference between the thermal conductivities of the product in said gas at 0.01 torr and at atmospheric pressure.

2. An improved method of freeze-drying frozen food or other heat labile products wherein ice formed within the product is sublimed while the product is maintained under a low gas pressure within a vacuum chamber, said method comprising the steps of: continuously heating the product within the vacuum chamber during drying to drive water vapour therefrom; continuously removing water vapour from the gas within the chamber during drying by condensation on a cold surface; continuously pumping the gas from said chamber to maintain the low pressure; sequentially admitting gas at two different rates into the vacuum chamber so that the low gas pressure within the chamber is alternately held at a higher level and then held at a lower level such that most of the sublimation occurs impulsively and most of the water vapour flows hydrodynamically from the product during the lower pressure periods and most of the heat flow into the product occurs during the upper pressure periods, the higher and lower pressure levels being such that the difference between the thermal conductivities of the product at the two pressures in the gas concerned is not substantially less than the difference between the thermal conductivities of the product in said gas at 0.01 torr and at atmospheric pressure.

3. A method according to claim 1 wherein the vacuum pressure is maintained at its lower level for periods each of which is such that the vapour transfer rate from the product reaches between 85% and 93% of its steady state value at the end of the period.

4. A method according to claim 1 wherein the vacuum pressure is maintained at its higher level for periods each of which is determined by assuming that the weighted mean of the high and low pressure conductivities of the product is equal to between 85% and 95% of the thermal conductivity of the dry product at the higher level, the duration of the lower pressure periods having been previously calculated or assumed.

5. A method according to claim 1 wherein the said gas is air, and the pressure is maintained at between 0.1 and 1 torr during the periods of lower level pressure, and the pressure is maintained at between 10 and 50 torr during the periods of higher level pressure.

6. A method according to claim 1 wherein the said gas is a high conductivity gas, and the pressure is maintained at between 0.1 and 1 torr during the periods of lower level pressure, and the pressure is maintained at between 100 and 200 torr during the periods of higher level pressure.

7. A method according to claim 1 wherein the pressure is maintained at its higher level for periods each of which is 1.5 to 9 times as long as each of the periods for which the vacuum is maintained at its lower level.

8. A method according to claim 1 wherein the vacuum pressure is maintained at its lower level for periods each of which is for 1 to 2½ minutes.

9. A method of freeze drying frozen meat comprising the steps of maintaining the vacuum pressure outside the meat between a lower level pressure of from 0.1 to 0.5 torr for a period of between 65 and 85 seconds, increasing the vacuum pressure to and maintaining it at a higher level pressure of from 15 to 25 torr for a period of between 200 and 250 seconds, repeating the two said steps in alternation until the meat is dried to the desired degree, and applying heat to the meat during the drying period, whereby ice is sublimed from the meat.

10. Improved apparatus for use in the freeze-drying of frozen food and other heat labile products comprising:
a vacuum chamber for receiving the product to be freeze-dried;
heating means within said vacuum chamber for continuously applying heat to a product within said chamber during drying;
a refrigerant coil or like cold surface within said chamber for freezing water vapour out of the atmosphere within said chamber;
a vacuum pump connected directly to said chamber for continuously evacuating the same during drying of the product; and
a first preset restriction and a first valve for admitting gas into the vacuum chamber through said first preset restriction, a second preset restriction and a second valve for admitting gas into the vacuum chamber through a second preset restriction, and a control timer operably connected with said valves for sequentially opening each valve for a different preset predetermined time so that, in operation, gas is admitted into the vacuum chamber first at one rate and then at a second and different rate whereby the continuous operation of the vacuum pump causes the vacuum pressure to rapidly change from an upper to a lower predetermined level.

References Cited

UNITED STATES PATENTS

| | | | |
|---|---|---|---|
| 2,528,476 | 10/1950 | Roos | 34—5 |
| 2,858,795 | 11/1958 | Walker | 34—92 |
| 2,994,132 | 8/1961 | Neumann | 34—5 |
| 3,234,661 | 2/1966 | Nerge | 34—92 |
| 3,255,534 | 6/1966 | Kan | 34—5 |
| 3,262,212 | 7/1966 | De Buhr | 34—5 |

WILLIAM J. WYE, *Primary Examiner.*